United States Patent
Wu et al.

(10) Patent No.: US 7,342,365 B2
(45) Date of Patent: Mar. 11, 2008

(54) SYSTEMS AND METHODS FOR REDUCING INPUT CURRENT IN PHOTOFLASH CHARGERS

(75) Inventors: Albert M Wu, Colorado Springs, CO (US); Steven M Pietkiewicz, Fremont, CA (US)

(73) Assignee: Linear Technology Corp., Milpitas, CA (US)

( * ) Notice: Subject to any disclaimer, the term of this patent is extended or adjusted under 35 U.S.C. 154(b) by 1 day.

(21) Appl. No.: 11/351,356

(22) Filed: Feb. 9, 2006

(65) Prior Publication Data
US 2007/0182253 A1   Aug. 9, 2007

(51) Int. Cl.
*G05F 1/00* (2006.01)
(52) U.S. Cl. .............. 315/291; 315/224; 315/276; 363/21.13
(58) Field of Classification Search ............ 315/209 R, 315/224–225, 276, 291, 307, 244, 308; 363/21.12, 363/21.13, 21.17, 97
See application file for complete search history.

(56) References Cited

U.S. PATENT DOCUMENTS

| | | | | |
|---|---|---|---|---|
| 3,764,887 A | * | 10/1973 | Bingley | 323/263 |
| 4,245,180 A | * | 1/1981 | Rilly et al. | 315/411 |
| 4,710,859 A | | 12/1987 | Rilly | 363/21.12 |
| 4,849,869 A | * | 7/1989 | Tanuma et al. | 363/21.13 |
| 4,975,823 A | | 12/1990 | Rilly et al. | 363/21.12 |
| 5,729,447 A | | 3/1998 | Albach et al. | 363/21.16 |
| 5,745,359 A | * | 4/1998 | Faulk | 363/95 |
| 5,841,239 A | * | 11/1998 | Sullivan et al. | 315/219 |
| 6,127,810 A | | 10/2000 | Sato et al. | 363/21.04 |
| 6,137,265 A | | 10/2000 | Cummings et al. | 320/133 |
| 6,366,480 B2 | | 4/2002 | Hosotani et al. | 363/21.14 |
| 6,518,733 B1 | | 2/2003 | Schenkel et al. | 320/166 |

(Continued)

FOREIGN PATENT DOCUMENTS

EP   1 253 810   10/2002

(Continued)

OTHER PUBLICATIONS

Darren Gnanapragasam, Schematic of "Roadrunner-Strobe Board Revision A," Motorola, Mar. 28, 2001.
Linear Technology, "LT3468/LT3468-1/LT3468-2 Photoflash Capacitor Chargers in ThinSOT," Linear Technology Corporation 2003.

(Continued)

*Primary Examiner*—Douglas W. Owens
*Assistant Examiner*—Jimmy Vu
(74) *Attorney, Agent, or Firm*—McDermott Will & Emery LLP

(57) ABSTRACT

A circuit for charging a photoflash that preferably reduces the average input to the switching regulator in an efficient fashion is provided. The regulator includes a transformer. The transformer includes a primary winding and a secondary winding.

The switching regulator also includes a switch that closes at the beginning of a first portion of the switching cycle and opens at the end of the first portion of the switching cycle. The second portion of the cycle may be to allow the secondary winding to release current into the load. The switch is adapted to allow the current to build up in the primary winding when the switch is closed. The switching regulator may also include a delay circuit that introduces a delay between the end of the second portion of the cycle and the beginning of the first portion of the next switching cycle.

26 Claims, 7 Drawing Sheets

U.S. PATENT DOCUMENTS

| | | | |
|---|---|---|---|
| 6,636,021 B2 | 10/2003 | Schenkel et al. | 320/166 |
| 6,728,117 B2 * | 4/2004 | Schemmann et al. | 363/21.12 |
| 7,233,504 B2 * | 6/2007 | Djenguerian et al. | 363/21.13 |
| 2003/0090240 A1 | 5/2003 | Schenkel et al. | 320/166 |

FOREIGN PATENT DOCUMENTS

| | | |
|---|---|---|
| JP | 54-144922 | 11/1979 |
| JP | 2-99933 | 4/1990 |
| JP | 5-153737 | 6/1993 |
| JP | 7-333693 | 12/1995 |
| JP | 9-257840 | 10/1997 |

OTHER PUBLICATIONS

Albert Wu, "Photoflash Capacitor Chargers Fit into Tight Spots," Linear Technology vol. XIII No. 4, Dec. 2003.

Linear Technology, "Power Management Solutions for Handhelds," Linear Technology Chronicle, vol. 13, No. 6, 2004.

Linear Technology, "LT3484-0/LT3484-1/LT-3484-2 Photoflash Capacitor Chargers,"Linear Technology Corporation 2005.

Mike Negrete, "Photoflash Capacitor Chargers Keep Up with Shrinking Cameras," Linear Technology Magazine: Design Features, Dec. 2005.

* cited by examiner

SYSTEMS AND METHODS FOR REDUCING INPUT CURRENT IN PHOTOFLASH CHARGERS

BACKGROUND OF THE INVENTION

This invention relates to photoflash chargers. More specifically, this invention relates to reducing input current in photoflash chargers.

A reduced average input mode—i.e., a mode in which the current flowing from a battery, for example, into a charging circuit—e.g., a switching regulator—to then be transferred to a load via the charging circuit is at a level that is less than the typical current flowing into the charging circuit—may be useful during periods when the charger does not require a relatively fast charging. One example of a situation which may use a reduced average input mode is at the end of a batteries charge, a user may want to "squeeze" a few more cycles out of the battery before the battery loses charge completely. A reduced average input mode may help accomplish this by squeezing out an additional few charging cycles, albeit at a slower pace than in a normal input current mode. The conventional method of reducing the average input current of a photoflash charger is to simply lower the current limit of the charging device.

Figure 1:
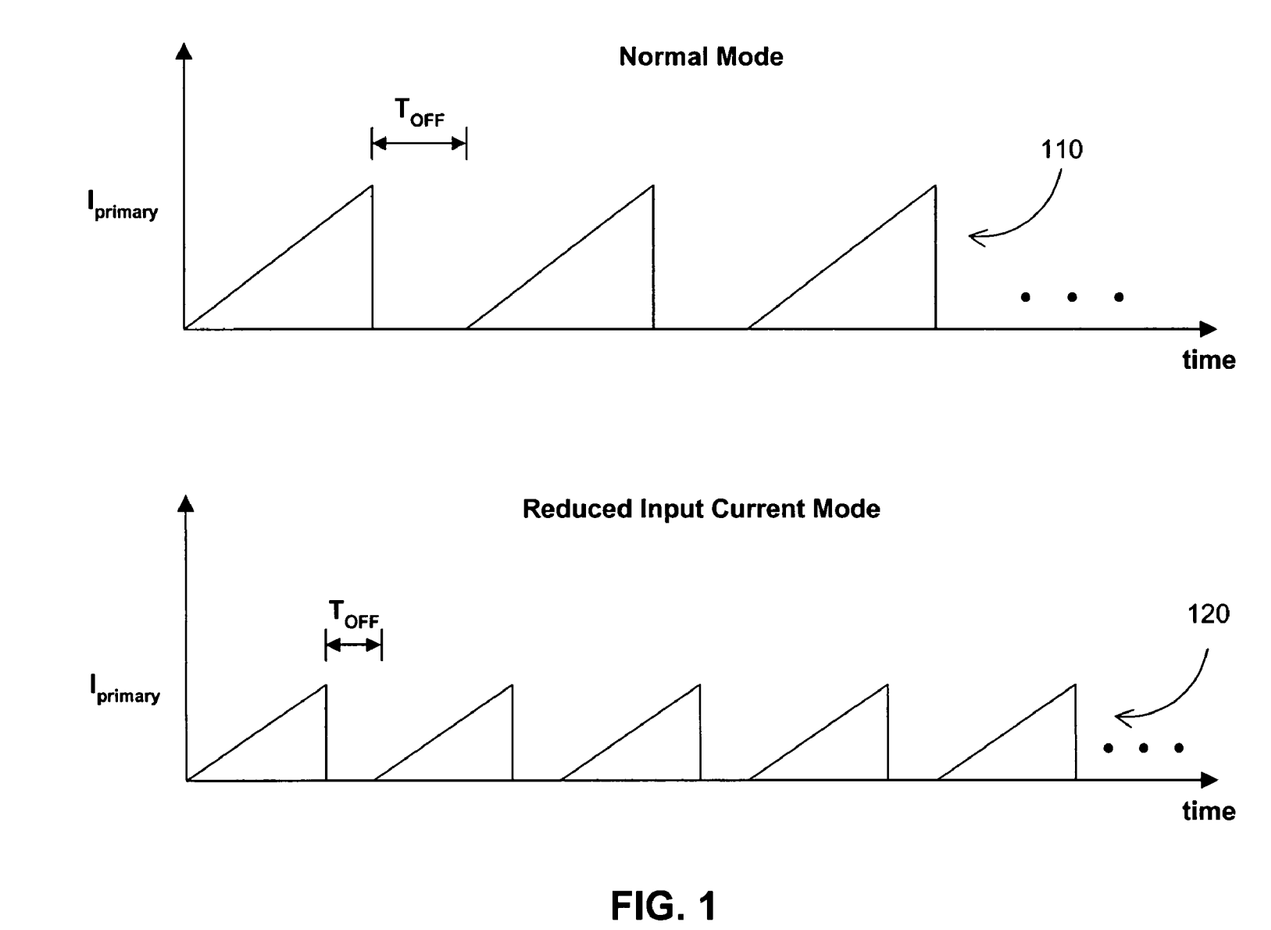
FIG. 1 is a schematic diagram of two prior art saw-tooth signals.

A normal mode and a reduced mode are shown in FIG. 1. Saw tooth diagram 110 shows the behavior of the normal charging current in the primary winding of an inductor in a photoflash charger. Saw tooth diagram 120 shows a reduced average input current.

This technique of reducing the current limit of the charging device reduces the average input current. However, in order to maintain a constant level of output load, the operating frequency of the charging device is increased. The OFF-time ($T_{OFF}$ in FIG. 1) of the power switch of the charging device is, consequently, also smaller. This shorter OFF-time can raise certain issues.

For example, some photoflash chargers, such as the LTC 3468 and the LTC 3484 produced by Linear Technology Corporation of Milpitas, Calif., use a flyback waveform across the primary winding of a transformer in a switching regulator to do indirect detection of $V_{OUT}$. When the current limit is reduced, the pulse width of the flyback waveform is also reduced. In such devices, the $V_{OUT}$ detection device, such as a comparator, has less time to detect when $V_{OUT}$ reaches a target output voltage. This may require that the primary inductance of the transformer be increased in order to maintain a predetermined minimum $T_{OFF}$ when the circuit is in reduced input current mode. Increasing the inductance of the primary winding is an undesirable outcome at least because it typically requires additional space on the printed circuit board to be set aside for the larger inductor.

Figure 2:
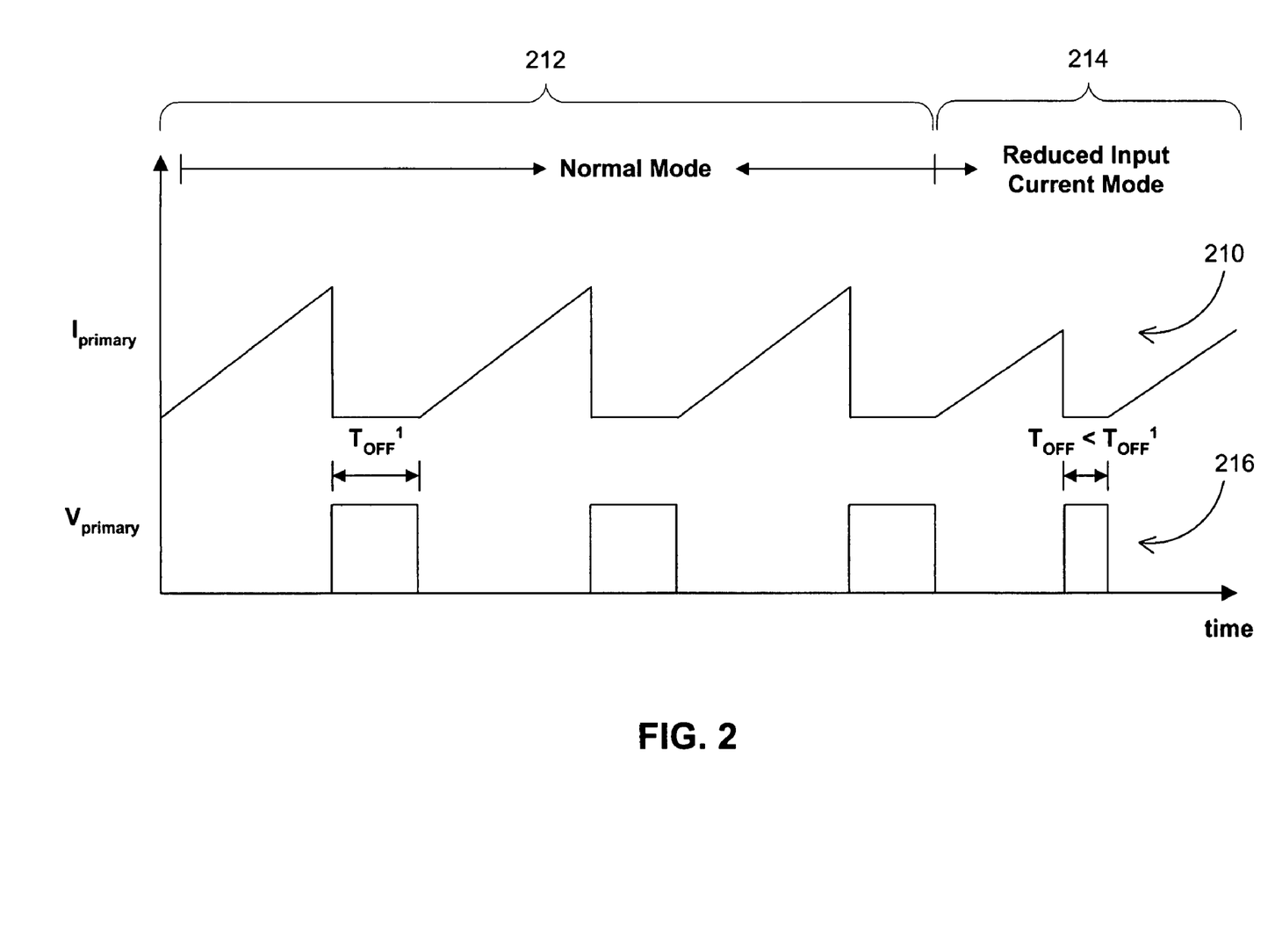
FIG. 2 is a schematic diagram of another prior art saw-tooth signal.

FIG. 2 graphically illustrates the reduced OFF time that occurs during reduced input current mode. Normal mode of saw tooth diagram 210 is shown in area 212. Reduced input current mode is shown in area 214. The diagram of $T_{OFF}$ 216 clearly indicates the reduced $T_{OFF}$ time during reduced input current mode 214.

It would be desirable to provide a photoflash charger that includes a reduced average input current mode that preserves a sufficiently large $T_{OFF}$ period. The increased $T_{OFF}$ period enables measurement of the primary winding without increasing the primary winding inductance.

SUMMARY OF THE INVENTION

It is an object of the invention to provide a photoflash charger that includes a reduced average input current mode that preserves a sufficiently large $T_{OFF}$ period. The increased $T_{OFF}$ period enables measurement of the primary winding without increasing the primary winding inductance.

In one embodiment of a switching regulator according to the embodiment, current builds up in the primary winding of a transformer in the switching regulator during a first portion of a switching cycle and current is released from the secondary winding into the load during a second portion of the cycle. The switching regulator also includes a switch that closes at the beginning of the first portion of the switching cycle. The switch is adapted to allow the current to build up in the primary winding when the switch is closed. The switch preferably opens at the end of the first portion of the switching cycle. The switching regulator may also include a latch that is coupled to control operation of the switch and that is responsive to conditions at the load. The switching regulator may also include a delay circuit that introduces a delay between the end of the second portion of the cycle and the beginning of the first portion of the next switching cycle. This delay portion of the cycle may be considered an artificially introduced, preferably independently-regulated, a third portion of the charging cycle. This third portion of the next cycle may cause the onset of the first portion of the next cycle to be delayed longer than it would typically be. The onset of the first portion of the switching cycle is typically after the substantially complete release of current from the secondary winding into the load. Alternatively, the delay could be introduced at any suitable point during the switching cycle.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

Systems and methods according to the invention preferably keep current limit of the photoflash charger the same while reducing the average input current. This method is preferably accomplished by introducing an intentional delay between the time after the current in the secondary winding of the transformer goes to zero and before the primary side switch is turned ON for the next cycle. While this patent application is directed to an embodiment that relates to a flyback configuration of a switching regulator, it should be understood to be applicable to all switching regulators—e.g., current-feedback or voltage-feedback or some combination of the two systems, buck or boost systems or some other suitable switching regulator.

Figure 3:
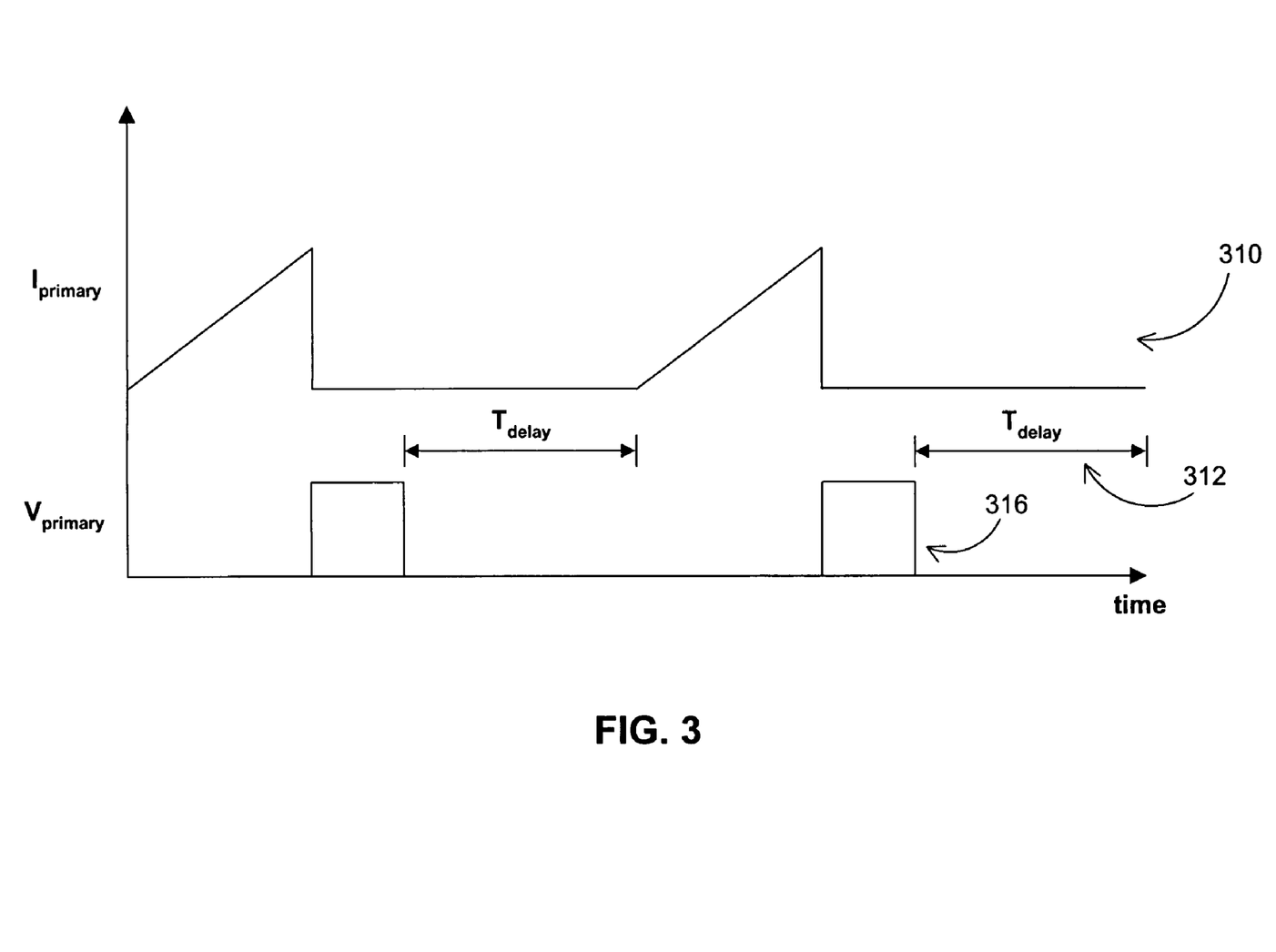
FIG. 3 is a schematic diagram of a saw-tooth signal according to the invention.

FIG. 3 preferably illustrates the effects of one embodiment of a method according to the invention. Saw-tooth 310 is differentiated from saw-tooth wave forms 110, 120 and 210 (shown in FIGS. 1 and 2) by the extended delay time 312, while the amplitude of saw-tooth 310 is maintained. The difference is further evident when the $T_{OFF}$ diagram 316 is compared to prior art $T_{OFF}$ diagram 216 (shown in FIG. 2). It can be seen that whereas $T_{OFF}$ 216 extends until the ramping up of saw-tooth 210, $T_{OFF}$ 316 according to the invention ends long before the following ramp-up of saw-tooth 310. The Tdelay 312 is introduced to lower average input current preferably without decreasing the width of the flyback pulse in saw-tooth 310.

One exemplary embodiment of a method according to the invention for use in a portable electronic application may be implemented in a portable battery-powered photoflash charger. As the battery voltage decreases, or is operating at a decreased level, the magnitude of Tdelay can be increased. This increase, which may be inversely proportional to the continued decreasing level of the battery, preferably maintains the level of the reduced input current at a constant reduced level preferably independent of changes to the battery voltage level. Alternatively, Tdelay can be increased at an even greater proportion than the Vbattery is dropping, thereby reducing the average input current even further. This further reduction in average input current may extend battery life.

Figure 4:
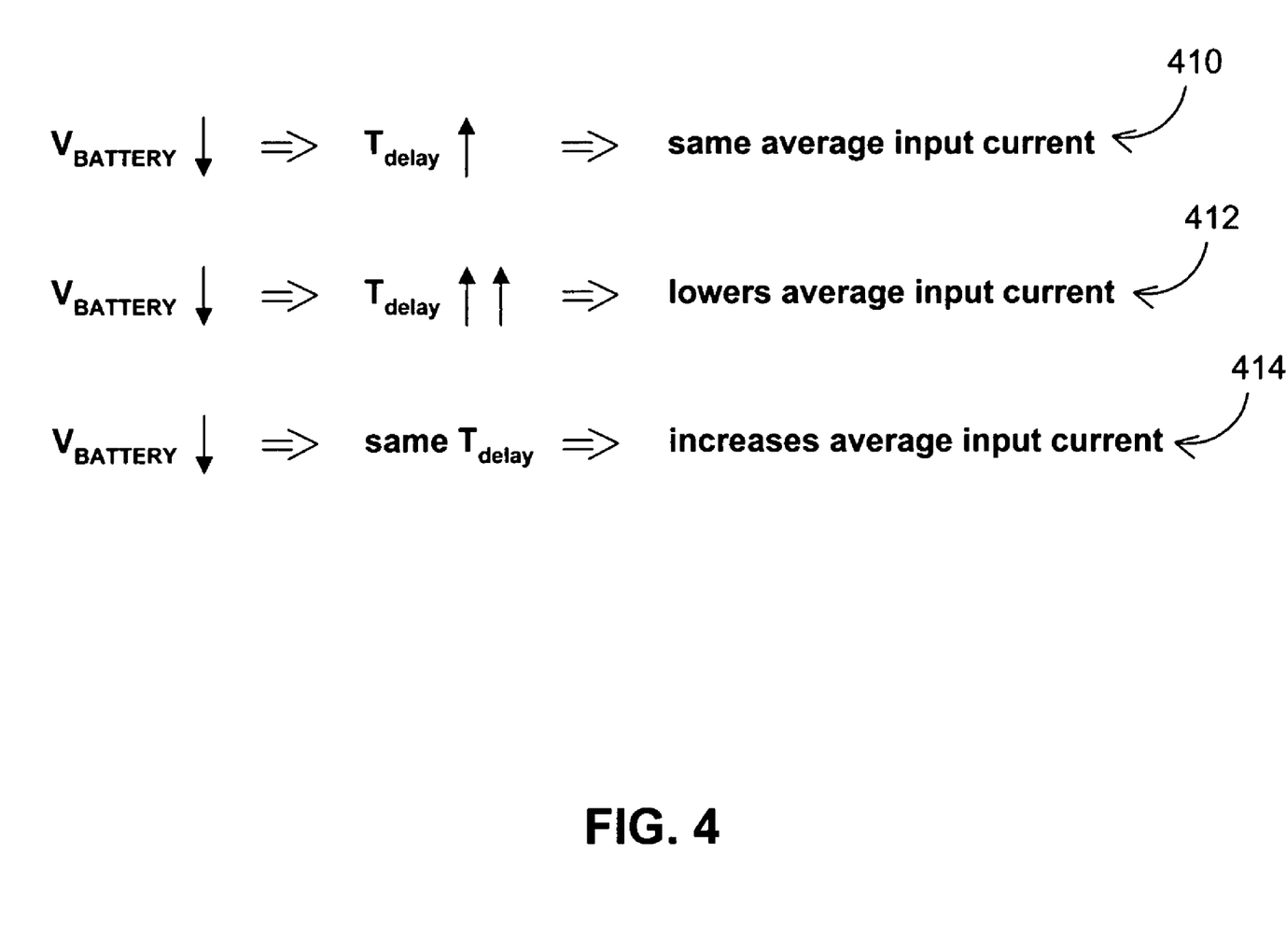
FIG. 4 is a chart of the effects of different periods of $T_{OFF}$ on the average input current according to the invention.

FIG. 4 shows a chart of various scenarios associated with a battery losing charge. First line 410 shows that when a battery is losing charge, or, alternatively, operating at a reduced charge, a commensurately proportioned increase in Tdelay preferably provides the same average input current to the switching regulator for transferring to the load (in this case a photoflash.) Thus, in this embodiment, the reduced average input current may preferably be maintained at a stable value, substantially invariant—i.e., independent—of changes in battery voltage.

Alternatively, line 412 shows making Tdelay even larger than the proportion shown in line 410 to further reduce the average input current as the Vbattery drops. This can further extend battery life. Finally, line 414 shows that by maintaining the average input current as Vbattery drops, the average input increases.

It should be noted that having the average input current vary somewhat while adding a variable delay may also be another embodiment of the invention. Thus, in this embodiment, the adding of the variable delay may be independent of whether or not the average input current is constant.

Figure 5:
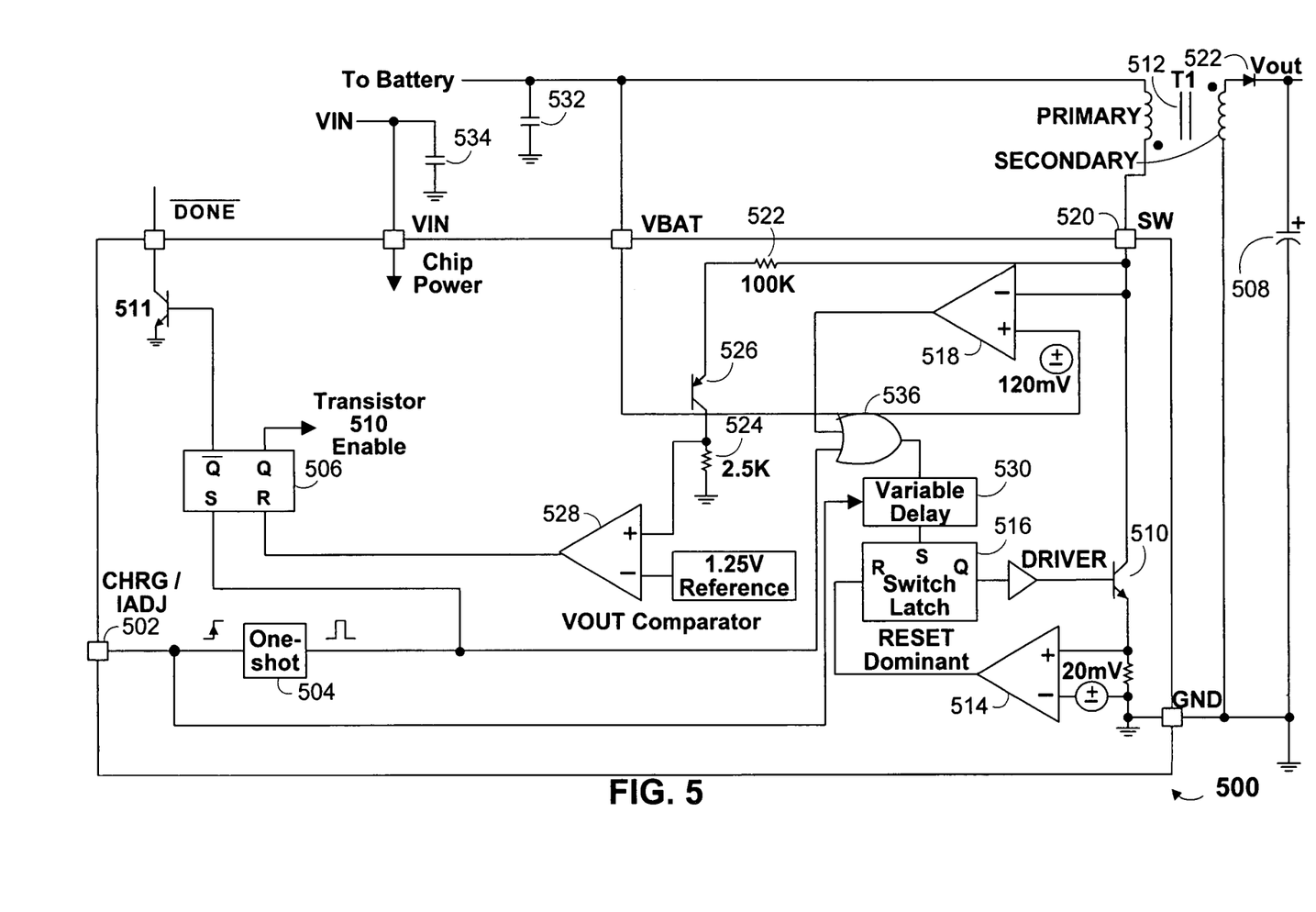
FIG. 5 is a schematic diagram of a circuit that implements a method according to the invention.

FIG. 5 shows an embodiment of a charging circuit 500 for producing and maintaining saw-tooth 310 in FIG. 3 or some other suitable charging output according to the invention and for obtaining the results shown in FIG. 4. It should be noted that all the values shown in FIG. 5 are merely exemplary and are not meant to limit the invention to any one particular value or range of values.

Circuit 500 operates as follows. When CHRG/IADJ pin 502 is driven higher than a preferably predetermined voltage in response to circuit conditions, one-shot circuit 504 fires and master latch 506 is set. Setting master latch 506 enables charging circuit 500 to deliver power to photoflash capacitor 508 as follows.

When the power switch transistor 510 is turned ON, current builds up in the primary winding of transformer 512. When the desired current level is reached, the output of comparator 514 goes HIGH, which resets switch latch 516 (which is preferably RESET Dominant in this embodiment) that controls the state of operation of transistor 510 (once transistor 510 has been enabled by latch 506, as described above), and the output of comparator 518 goes low. Transistor 510 now turns OFF. At this point the flyback waveform (such as square wave 316 shown in FIG. 3 which approximates a level that is proportional to Vout/N plus Vbattery (N being the turns ratio of the transformer)) on the SW node 520 quickly rises to a level proportional to Vout. The secondary current flows through high voltage diode 522 and into photoflash capacitor 508.

When the secondary current decays to zero, the voltage on SW node 520 collapses as well. In this embodiment, when this voltage reaches about 120 millivolts higher than Vbattery, the output of comparator 518 goes high. This sets switch latch 516 and transistor 510 turns back ON. This cycle repeats until the threshold Vout level is reached. When the threshold Vout level is reached, master latch 506 resets, and pushes the DONE pin low via transistor 511. The output level that is compared to the threshold by comparator 528, or other suitable comparison circuit, is sensed via resistor 522, resistor 524, and transistor 526.

In one exemplary embodiment of the invention, the input current of circuit 500 can be reduced by changing the voltage of the CHRG/IADJ pin 502 as follows. In this embodiment, when CHRG/IADJ pin 502 is between 1 Volt and 1.25 Volts, a time delay is added between when comparator 518 goes HIGH and when switch latch 516 is set. This delay is implemented in the schematic by showing variable delay circuit 530 which can be implemented using any suitable technique, the technique for providing a voltage-based variable delay circuit being well known in the art.

Figure 6:
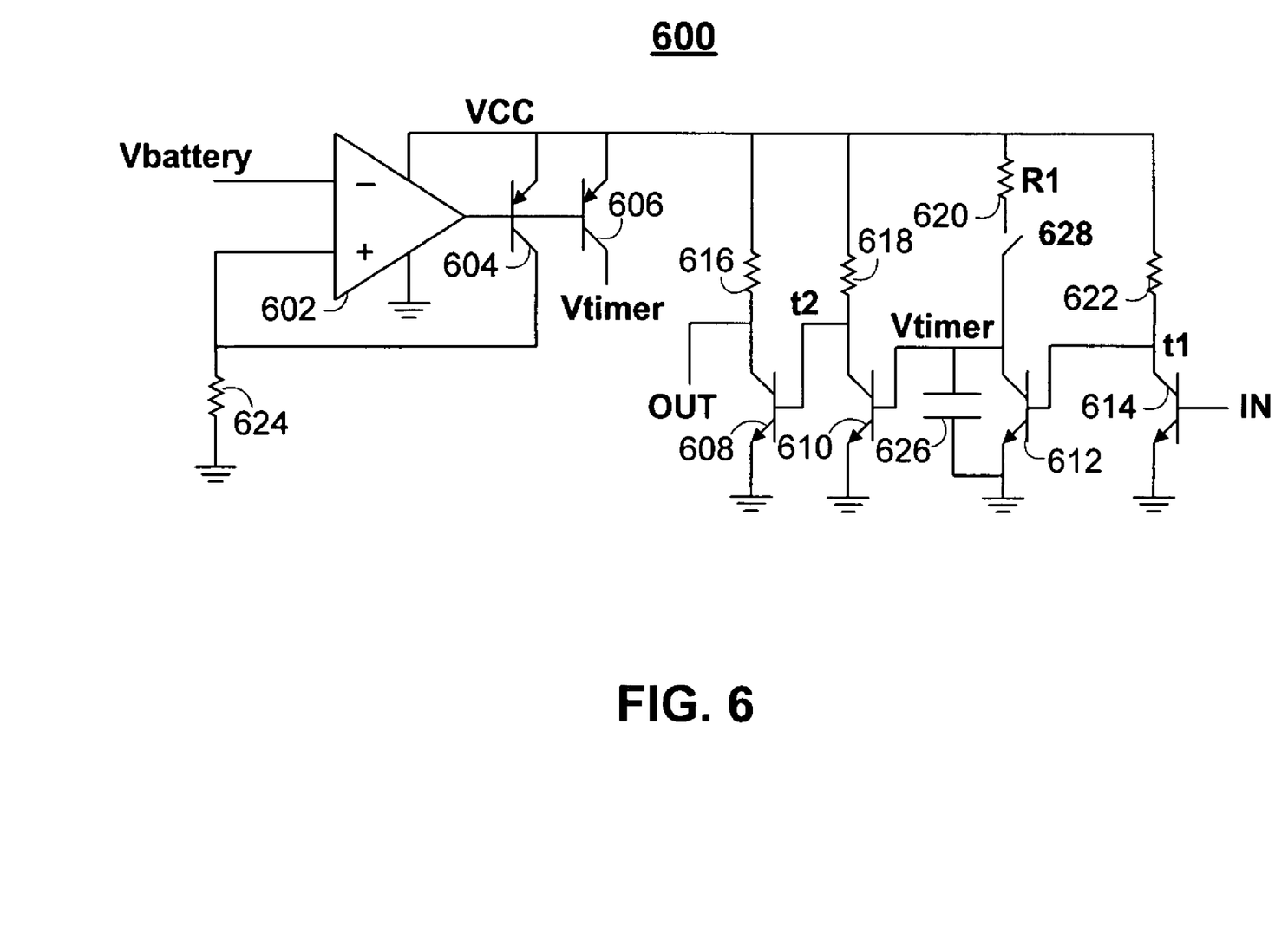
FIG. 6 is a delay circuit.
Figure 7:
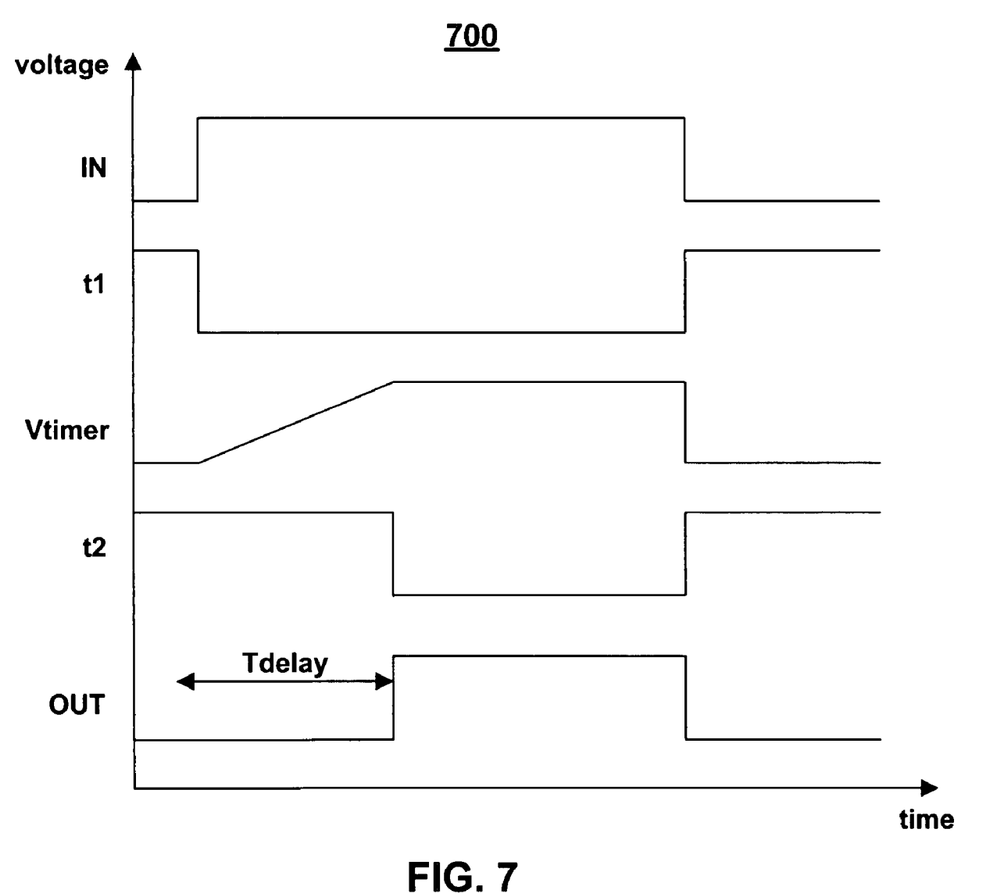
FIG. 7 is a timing diagram of the operation of the circuit in FIG. 6.

FIGS. 6 and 7 show one exemplary embodiment of a delay circuit that may be used according to the invention. FIG. 6 shows circuit 600 which includes comparator 602, transistors 604, 606, 608, 610, 612 and 614, resistors 616, 618, 620, 622, and 624, capacitor 626, and switch 628. FIG. 7 shows the timing diagram 700 which illustrates the operation of the circuit 600 shown in FIG. 6.

The circuit shown in FIG. 6 operates as follows. When switch 628 is open, Tdelay is inversely proportional to Vbattery level. When switch 628 is closed, resistor 620 dominates so Tdelay may be set to be very small and, in fact, negligible with respect to operation of the circuit 500 in FIG. 5. Switch 628 may preferably be controlled by the signal on the CHRG/IADJ pin 502 (see FIG. 5). In one embodiment of the invention, when CHRG/IADJ pin 502 is higher than 1.6 volts, switch 628 is closed and the delay is negligible. When CHRG/IADJ pin 502 is between 1.0 volts and 1.2 volts, switch 628 is open, and the delay is inversely proportional to the Vbattery level. Other configurations of delay circuits, as well as other implementations of delay circuit 600 are possible and, in fact, the invention is not limited to the exemplary embodiment shown in FIG. 6.

In this embodiment of the invention, if variable delay circuit 530 is enabled, and the CHRG/IADJ pin 502 is allowed to float, internal circuitry (not shown) drives the voltage on the pin to 1.2 Volts. This preferably allows a single I/O port pin, which can preferably be tri-stated, to enable or disable the variable delay circuit 530 as well as to place the variable delay circuit 530 into the reduced average input current mode, which is described in detail above. This feature reduces the average input current into flyback transformer 512. Capacitors 532 and 534 are used to stabilize the respective battery signals and VIN. Finally, OR gate 536 is used to allow signals either from one-shot 504 or comparator 518 to set switch latch 516.

In one embodiment of the invention, the magnitude of the delay may preferably decrease with increasing Vbattery. This may cause the reduced average input current to remain relatively flat with changes in Vbattery (See line 410 in FIG. 4). In this exemplary embodiment, when CHRG/IADJ pin 502 is brought higher than 1.6 Volt, no delay is added.

It will be understood that the foregoing is only illustrative of the principles of the present invention, and that the invention can be practiced by other than the described embodiments, which are presented for purposes of illustration and not of limitation.

What is claimed is:

1. A switching regulator that delivers current to a load, the regulator comprising:
   a transformer comprising:
      a primary winding; and
      a secondary winding, wherein current builds up in the primary winding during a first portion of a switching cycle, and current is released from the secondary winding into the load during a second portion of the cycle; and
   a delay circuit that introduces a delay between the end of the second portion of the cycle and the beginning of the first portion of an immediately succeeding switching cycle based at least in part on a voltage of a battery that supplies current to the switching regulator.

2. The switching regulator of claim 1 wherein said delay circuit is a variable delay circuit.

3. The switching regulator of claim 1 wherein said delay circuit is a voltage-dependent variable delay circuit.

4. The switching regulator of claim 1, wherein said delay circuit introduces the delay which is inversely proportional to the voltage of the battery.

5. The switching regulator of claim 1 wherein the delay circuit is disabled when an input voltage to the switching regulator is above a first threshold.

6. The switching regulator of claim 1 wherein the delay is adapted to 1) increase, 2) decrease or 3) maintain an average current delivered from the switching regulator to the load.

7. A method for providing power to a load, the method using a switching regulator that delivers current to a load, the method comprising:
   building up current in a primary winding of a transformer during a first portion of a switching cycle;
   releasing current from a secondary winding into the load during a second portion of the cycle; and
   following the end of the second portion of the cycle, delaying the onset of the first portion of a next-in-time switching cycle based at least in part on a voltage of a battery that supplies current to the switching regulator.

8. The method of claim 7 further comprising varying the length of said delaying.

9. The method of claim 7, wherein said delaying is inversely proportional to the voltage of the battery.

10. The method of claim 7, further comprising disabling a delay circuit, the delay circuit that provides the delaying, when an input voltage to the switching regulator is above a first threshold.

11. The method of claim 7, wherein the delaying is adapted to 1) increase, 2) decrease or 3) maintain an average current delivered from the switching regulator to the load.

12. A switching regulator that delivers current to a load, the regulator comprising:
   a transformer comprising:
      a primary winding; and
      a secondary winding, wherein current builds up in the primary winding during a first portion of a switching cycle, and current is released from the secondary winding into the load during a second portion of the cycle;
   a switch that closes at the beginning of the first portion of the switching cycle, the switch that is adapted to allow the current to build up in the primary winding when the switch is closed, the switch that opens at the end of the first portion of the switching cycle;
   a latch that is coupled to control operation of the switch and that is responsive to conditions at the load; and
   a delay circuit that introduces a delay between the end of the second portion of the switching cycle and the beginning of the first portion of the next switching cycle based at least in part on a voltage of a battery that supplies current to the switching regulator.

13. The circuit of claim 12 wherein the delay circuit introduces a delay that delays the communication of the latch circuit and the switch.

14. The circuit of claim 12 wherein the delay circuit introduces a delay that delays the communication of the output conditions of the circuit to the latch circuit.

15. The switching regulator of claim 12, wherein said delay circuit introduces the delay which is inversely proportional to the voltage of the battery.

16. A method for delivering current to a load, the method comprising:
   building up current in a primary winding during a first portion of a switching cycle, and releasing current from a secondary winding into the load during a second portion of the cycle;
   closing a switch at the beginning of the first portion of a switching cycle, the switch that is adapted to allow the current to build up in the primary winding when the switch is closed, and opening the switch at the end of the first portion of the switching cycle;
   using a latch to control operation of the switch and that is responsive to conditions at the load; and
   introducing a delay between the end of the second portion of the cycle and the beginning of the first portion of the next switching cycle based at least in part on a voltage of a battery that supplies the current for the load.

17. The circuit of claim 16 wherein the delay circuit introduces a delay that delays the communication of the latch circuit and the switch.

18. The circuit of claim 16 wherein the delay circuit introduces a delay that delays the communication of the output conditions of the circuit to the latch circuit.

19. The method of claim 16, wherein said delay is inversely proportional to the voltage of the battery.

20. A switching regulator for delivering current into a load, comprising:
   a transformer comprising a first winding and a second winding; and
   circuitry for controlling a switching cycle of the switching regulator, the switching cycle including:
      a first portion for building up current in the primary winding;
      a second portion for releasing current from the secondary winding into the load; and
      a third portion comprising a voltage-dependent time delay between the completion of the second portion and the onset of a first portion of the next cycle, the voltage-dependent time delay being based at least in part on a voltage in a battery that supplies current to the switching regulator.

21. A method for providing power to a load, the method using a switching regulator that delivers a current to a load, the method comprising:

building up a current in a primary winding of a transformer during a first portion of a switching cycle;

releasing current from a secondary winding into the load during a second portion of the cycle;

following the end of the second portion of the cycle, delaying the onset of the first portion of a next-in-time switching cycle; and disabling a delay circuit when an input voltage to the switching regulator is above a first threshold, the delay circuit that controls the delaying such that an average input current that is proportional to the current in the primary winding is substantially independent of variations to the delay.

22. A switching regulator comprising:

a first circuit configured for controlling a switching cycle of the switching regulator, the switching cycle including first and second portions, the second portion of the cycle allowing the switching regulator to deliver current to a load; and a second circuit configured for introducing a delay between the end of the second portion of the cycle and the beginning of the first portion of an immediately succeeding switching cycle based at least in part on a voltage of a battery that supplies current to the switching regulator.

23. The switching regulator of claim 22 wherein said second circuit is a variable delay circuit.

24. The switching regulator of claim 22 wherein said second circuit is a voltage-dependent variable delay circuit.

25. The switching regulator of claim 22, wherein said second circuit is configured for introducing the delay which is inversely proportional to the voltage of the battery.

26. The switching regulator of claim 22 wherein the delay is adapted to 1) increase, 2) decrease, or 3) maintain an average current delivered from the switching regulator to the load.

* * * * *